United States Patent [19]

Bandara et al.

[11] Patent Number: 4,692,832
[45] Date of Patent: Sep. 8, 1987

[54] METHOD FOR LOWERING THE FRICTIONAL COEFFICIENT OF THE MAGNETIC HEAD-DISK INTERFACE IN A LUBRICATED MAGNETIC DISK STORAGE SYSTEM

[75] Inventors: Upali Bandara, Stuttgart; Holger Hinkel, Boblingen, both of Fed. Rep. of Germany

[73] Assignee: International Business Machines Corporation, Armonk, N.Y.

[21] Appl. No.: 882,646

[22] Filed: Jul. 7, 1986

[30] Foreign Application Priority Data

Aug. 6, 1985 [EP] European Pat. Off. ........ 85109846.7

[51] Int. Cl.⁴ .......................... G11B 21/02; G11B 5/55
[52] U.S. Cl. ...................................... 360/137; 360/75; 360/106
[58] Field of Search .............................. 360/75, 97–99, 360/106, 109, 137

[56] References Cited

U.S. PATENT DOCUMENTS

| 4,445,188 | 4/1984 | Barrett | 360/75 X |
| 4,530,021 | 7/1985 | Cameron | 360/97 |
| 4,542,429 | 9/1985 | Nishida et al. | 360/75 X |

Primary Examiner—John H. Wolff
Attorney, Agent, or Firm—Thomas R. Berthold

[57] ABSTRACT

The frictional coefficient and triboelectric current that exist between the magnetic-head carrying slider and the surface of a magnetic disk when both are in sliding contact are reduced by an appropriate pre-conditioning. The pre-conditioning comprises running the head-disk assembly for at least several minutes at a low velocity of, e.g. 200 to 400 rpm, in a dry gas atmosphere. By this pre-conditioning the lifetime of lubricated head-disk assemblies is increased.

5 Claims, 2 Drawing Figures

METHOD FOR LOWERING THE FRICTIONAL COEFFICIENT OF THE MAGNETIC HEAD-DISK INTERFACE IN A LUBRICATED MAGNETIC DISK STORAGE SYSTEM

BACKGROUND

The present invention relates to a method for lowering the frictional coefficient of the magnetic head-disk interface in a magnetic disk storage system comprising magnetic disks with lubricated surfaces and magnetic heads that are mounted on sliders which in operation of the system are supported on air cushions formed between air bearing surfaces of the sliders and the rotating disk surfaces. The air bearing surfaces of the magnetic head sliders are in contact with the disk surfaces during sliding phases of start/stop operations of the system.

Disk packs containing several lubricated disks and associated head/slider combinations are usually contained in an enclosure. These so-called head-disk assemblies, HDAs, include a closed air system in which the circulating air is filtered so that practically dust-free air is ventilated. Such disk storage systems, HDAs and air systems are described in U.S. Pat. Nos. 4,034,411, 4,190,411, 4,285,018, IBM Technical Disclosure Bulletins Vol. 21, No. 6, November 1978, p. 2514, and Vol. 22, No. 6, November 1979, p. 2474.

Rigid disk files used for on-line storage have a disk pack spinning at high speed. Depending on the application the file is designed for, the spinning speed is from approximately 2,000 to 6,000 rpm, resulting in a 14-inch disk with a linear velocity of 33 m/sec to 100 m/sec, respectively. At 3,600 rpm the linear velocity is 60 m/sec. This is 100 to 500 times faster than the tape speed in a conventional cartridge. Contact of the head with the disk would be a disastrous event at such velocity. Therefore, contact of the head with the disk must be avoided during flight and therefore lubrication of the disk is provided, because of the required proximity of the head to the recording medium. The head is carried on the tail of a slider that is supported on an air bearing, the air bearing being created by an air bearing surface on the slider. Examples of conventional head/slider combinations are shown in U.S. Pat. Nos. 3,823,416; 3,855,625; and 4,251,841.

In a disk file that is not operating, the slider, with its magnetic transducer head on its tail, sits on the disk. When the disk starts to rotate the slider glides in contact with the disk surface until the take-off speed is reached. It will not reach stable flight immediately but contacts the disk several times, causing hopping. Similar dynamic interaction of the slider will happen upon landing when the system is turned off. To minimize friction during these start/stop operations the disk is provided with a lubricant.

Lubrication is generally done by applying oil to the disk. Such oil layer must be thin enough not to impede the flight by accumulation, not to mix with dust or debris, and not to cause lubricant transfer in a large amount to the slider and head. It must be easily applicable and remain on the disk surface over the lifetime of the system. Thus the lubricant must wet the recording medium or be chemically attached and must not form droplets (autophobia) and be spun off. Furthermore, it must not change viscosity, nor cause the slider to stick to the disk at its rest position. If stiction occurs between the slider and the disk the retaining forces can be strong enough to cause permanent distortion and damage of the head suspension. Such incidence can also cause the slider to damage the magnetic layer and generate debris. Due to the air circulation within the head-disk assembly the debris can be transferred to other disks and may obstruct proper flying of the head or cause a head crash.

These described interactions of the slider with a head and the surface of the disk are the most frequently occurring incidents that make a disk file inoperable.

In contrast, there are extremely few incidents that render a disk file unusable due to other malfunctions of the magnetic heads or disks themselves, e.g. for environmental circumstances. Almost all incidents occur as a consequence of the tribological system comprising the slider-head, lubricant, and magnetic medium under the extreme forces and circumstances mentioned above. It has been found out that lubrication does not solve all problems to increase the lifetime of a disk storage system or diminish wear. The head-disk interface problems, such as stiction, i.e. the slider sticking in its rest position to the disk, friction during starting and stopping, depletion of lubricant, or debris on the slider, all lead to possible head crashes and to diminishing disk file life expectancy. One of the causes of these problems appears to be humidity and its influence on the lubricant.

In an article entitled "Stiction at The Winchester Head-Disk Interface" by Chin C. Liu and Peter B. Mee, published in *IEEE Transactions on Magnetics*, Vol. MAG-19, No. 5, September 1983, pp. 1659–61, the role of humidity in these problems is described. In accordance with this article stiction was found experimentally to be very sensitive to the humidity of the environment. The texture of the disk surface, the slider loading, lubricant thickness, water adsorption, susceptibility of the disk surface, the purging process and water-lubricant interaction were all considered as important parameters for stiction initiation. It was found that a water drop can diffuse through the lubricant layer and displace the lubricant from the disk surface by lateral advance. During the drying process, the surface tension of the thin water film will pull the two solid surfaces together and produce deformation at the areas of actual contact. The thinner the film thickness, the higher the adhesion force which will be produced. The magnitude of stiction thus depends on the amount of water condensation, the degree of water diffusion through the lubricant films and the amount of lubricant replaced by water molecules at the contact area. In the case of severe stiction, a solid-solid junction could be formed.

SUMMARY

The present invention solves the above mentioned problems in a very simple and advantageous manner and drastically improves the lifetime of magnetic disk storage systems.

In accordance with the present invention, a pretreatment of the head-disk assemblies is provided by running them in such a manner that there is sliding contact between slider and disk at a low velocity, e.g. 200 to 400 rpm, for a relatively short period of time, e.g. 1 to 4 minutes, in a dry atmosphere, e.g. dry air or nitrogen ($N_2$) with a relative humidity of less than 1 %.

The advantages offered by the invention and the pre-treatment method is that the frictional coefficient and the triboelectric current are drastically reduced in a very simple manner and thus the lifetime of magnetic disk storage systems so treated is increased enormously.

For a fuller understanding of the nature and advantages of the present invention, reference should be made to the following detailed description taken in conjunction with the accompanying drawings.

DESCRIPTION OF THE PREFERRED EMBODIMENTS

Figure 1:
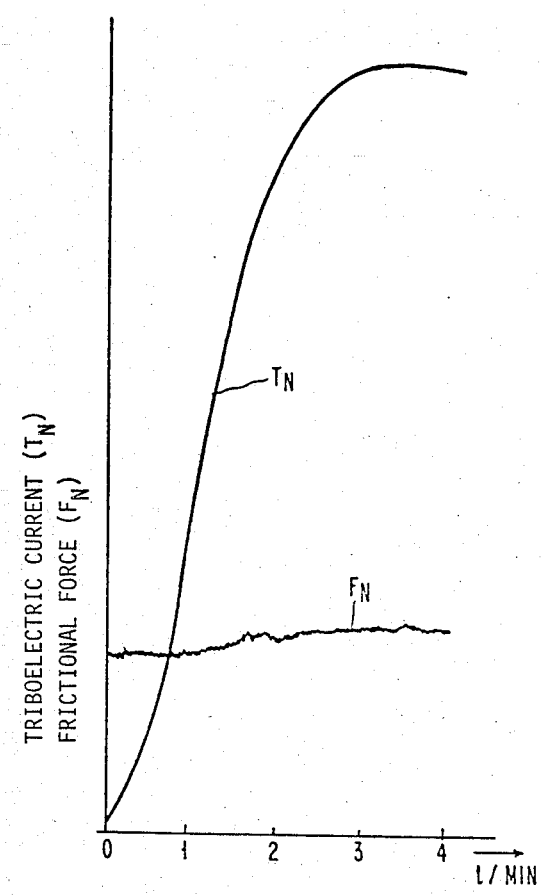
FIG. 1 shows a diagram of the friction force and of the triboelectric current over the time of a head-disk interface during the pre-conditioning phase of running in a dry $N_2$ atmosphere.
Figure 2:
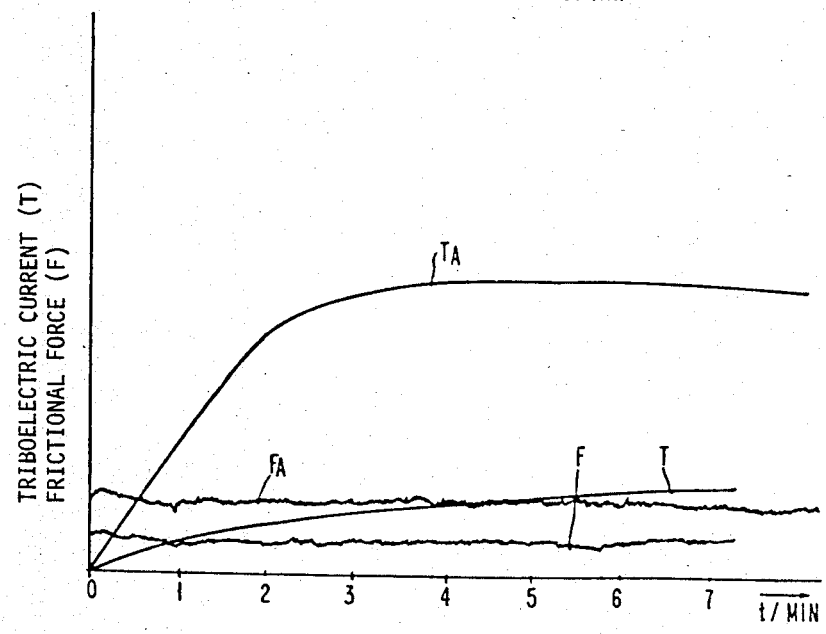
FIG. 2 shows diagrams of friction force and triboelectric current of a conventional head-disk interface and a pre-conditioned head-disk interface running in normal air.

FIGS. 1 and 2 show in equal scale two important parameters as a function of friction F and triboelectric current T which exist between the head-carrying slider and the disk surface when the slider is in frictional sliding contact with the disk surface.

The plot of FIG. 1 shows the dependence of triboelectric current $T_N$ and friction $F_N$ in dry nitrogen $N_2$. The plot is shown for a 4 minute duration sliding contact between slider and disk surface at a velocity of about 200 to 400 rpm. The triboelectric current $T_N$ that is generated in this head-disk interface and flows between slider and disk, increases very rapidly and reaches a saturation after about 3 minutes.

The triboelectric current has been found to be a measure of the behavior of the head-disk interface system. The triboelectric current usually decreases when the slider takes off at about 800 to 1,000 rpm during starting of the HDA. If during normal disk operation triboelectric current is observed a disk failure can be predicted to happen in a very short period of time. It is believed that the triboelectric current is detrimental to the lubricant and thus in a way contributes to shortening the lifetime of HDAs.

Head-disk assemblies pre-conditioned in dry $N_2$ and operated afterwards in normal air, e.g. 45 % relative humidity (RH), show a much lower triboelectric current T and friction F. This is shown by FIG. 2. The two lower triboelectric current and friction curves show these values after the pre-conditioning phase for which FIG. 1 shows the friction and current values $F_N$ and $T_N$. For purposes of comparison, the friction $F_A$ and the triboelectric current $T_A$ are shown in FIG. 2 for a head-disk assembly that was not pre-conditioned.

As can be seen from FIG. 2, the value of friction F of a pre-conditioned HDA is about 30 to 50 % smaller than the friction value $F_A$ of a HDA not pre-conditioned in accordance with the present invention.

Also, as can be seen from FIG. 2, the triboelectric current T of a pre-conditioned head-disk assembly HDA is only about 30 percent of the triboelectric current $T_A$ of a head-disk assembly that was not being pre-conditioned in accordance with the present invention.

Experiments under comparable conditions with running head-disk assemblies in dry argon, dry $O_2$, in dry synthetic air at various values of relative humidity, RH 0 % to 90 %, revealed that the humidity is the most relevant parameter. It influences both the triboelectric current T and the frictional coefficient F.

Surprisingly it has been found that a pre-conditioning run for several minutes in a dry gas (i.e. less than 1 % RH) atmosphere, regardless of the type of gas, at a low velocity so that the slider slides on the disk surface, drastically improves both triboelectric current and friction values of head-disk assemblies when they are later operated in normal environment, i.e. air having about 45 % RH.

A simple flooding of HDA's with a dry gas without sliding contact between head carrying slider and disk surface does not bring this result. Also a continuous operation of head-disk assemblies in dry air is not suited as the frictional force in this atmosphere is rather high.

The experiments showing the surprising results of the pre-conditioning in accordance with the invention were made with sliders made from a ceramic mixture of TiC and $Al_2O_3$, about 20 to 40% TiC and 60 to 80 % $Al_2O_3$, and particulate magnetic disks containing magnetic particles, such as $\gamma$-$Fe_2O_3$, in a phenolic binder system. After more than 2 hours of a sliding test, which corresponds to about 25 % of the system lifetime, no increase of frictional coefficient or triboelectric current was observed.

The pre-run or pre-conditioning of a HDA can be performed as follows: A newly produced and assembled head-disk assembly is flooded with dry gas of less than 1% RH, preferably nitrogen $N_2$. The disk pack is rotated at 200 to 400 rpm so that the sliders remain in sliding contact with the disk surfaces and slide on them. The head carrying sliders are swept by the actuator over the entire magnetically active disk surface so that each track is pre-conditioned. Thus the entire surface is pre-conditioned. The time for running on each track is appropriately chosen so that the effect is assured. As shown, a time of 1 to 4 minutes has proven adequate. At the end of the pre-conditioning phase the dry gas is removed. Normal air with about 45 % RH is then used in the operating of the system.

The pre-conditioning can be performed with the same heads that are later used in the disk file. This makes the application of the pre-conditioning relatively easy. However, the pre-conditioning in accordance with the present invention can also be performed with special heads that are not later used in the head-disk assembly.

By the inventive pre-conditioning an increased lifetime of head-disk assemblies is ensured. Furthermore a diminished sensitivity relative to variations of production parameters is achieved.

While the preferred embodiment of the suspension has been described and illustrated with a self-loading slider, the basic concept of the suspension is capable of utilization with a slider requiring a loading force. It should be noted, however, that modifications and adaptations to the invention, such as the examples just described, can be made without departing from the scope of the invention, which is set forth in the following claims.

What is claimed is:

1. A method for lowering the frictional coefficient of the magnetic head-disk interface in a magnetic disk storage system of the type having at least one magnetic disk with data tracks and a lubricated surface and at least one magnetic head mounted on a slider, the slider being supported on an air cushion formed between an air bearing surface of the slider and the rotating disk surface during operation of the system and being in contact with the disk surface during sliding phases at starting and stopping of the system, the method comprising the steps of:

rotating the disk at a rotational velocity lower than normal operational velocity so that the slider slides in contact on its associated disk surface, the disk rotation being performed in an atmosphere of gas at relatively low humidity; and moving the slider over all tracks of the disk during rotation of the disk, so that the complete recording surface of the disk is conditioned by the slider.

2. The method according to claim 1, wherein the step of rotating the disk includes rotating the disk at a rotational velocity of between approximately 200 and 400 revolutions per minute.

3. The method according to claim 1 wherein the step of moving the slider over all tracks further comprises maintaining the slider in contact with each track for a time period of between approximately one to four minutes.

4. The method according to claim 1 wherein the step of rotating the disk includes performing the rotation in an atmosphere of nitrogen or air.

5. The method according to claim 1 wherein the steps are performed prior to operational use of the magnetic disk storage system.

* * * * *